UNITED STATES PATENT OFFICE.

CHARLES ALBERT KELLER, OF PARIS, FRANCE.

MANUFACTURE OF STEEL.

1,316,724.        Specification of Letters Patent.        Patented Sept. 23, 1919.

No Drawing.      Application filed August 10, 1917. Serial No. 185,618.

*To all whom it may concern:*

Be it known that I, CHARLES ALBERT KELLER, citizen of the Republic of France, residing at Paris, France, have invented new and useful Improvements in the Manufacture of Steel, of which the following is a specification.

The invention relates to the process of manufacturing steel and particularly to a process in which scrap iron, scrap steel, shavings and the like are used as basic material.

It is an object of the invention to carry out the process in two separate and distinct steps, whereby a more economical mode of production is obtained and whereby also the output may be considerably enlarged.

It is a further object of the invention to carry out the initial or first step in a furnace, open at the top and capable of continuously receiving the charging material such as shavings, and similar iron and steel waste products whereby a metal is produced which is not a completely finished product and thus may be conveniently transferred to a second furnace to carry out the second step consisting of the finishing process.

A further object of the invention constitutes the carrying out the finishing process in a furnace containing solely the liquid metal. This furnace is of ordinary construction closed on the top and possesses the usual charging doors permitting the introduction of fluxes or other material to change the character of the metal bath.

It is also an object of the invention to provide an electric furnace open at the top for carrying out the first step of the process, the raw material being introduced through the open top around a vertical, movable electrode of the furnace.

The process at present in vogue for the manufacture of steel in an electric-furnace includes the employment of a furnace closed at the top and equipped with charging doors wherethrough the charge is introduced in one operation or in several succeeding operations and only after complete fusion or melting of each introduced charge. The method of operating the successive charges requires the employment of massive scrap and certainly cannot be employed in connection with iron and steel shavings which are comparatively light and small. The present method furthermore is objectionable for the reason that special precautions have to be taken whenever the charge has been melted in order to impart to the liquid metal such properties which are required to obtain a high grade steel. The output based on this method is necessarily limited and can only be multiplied by the application of a number of furnaces which, however, has the disadvantage that every furnace must be attended to and observed for the purpose of taking samples, making control tests and carrying out other experiments requiring the employment of a large number of technically trained experts. It is furthermore found that the employment of iron and steel shavings in electrical furnaces having charging doors, entails bad results as adherence between the comparatively small pieces is necessary for the proper carrying out of the process.

The present method is evolved with a view to obviate the disadvantage inherent in the older methods, and divides the process of manufacturing steel into two distinct and separate steps carried out in two different furnaces. The first furnace designated as a melting furnace is provided with a slag of suitable composition which is mixed with the charge. The liquid metal thus obtained in the melting furnace is subsequently finished in a type of furnace which shall be designated as refining furnace.

The primary or melting furnace employed according to the present method is an electric furnace of known construction. It has a non-carburizing hearth and is open at the top through which the material may be introduced around a movable, vertical electrode. The chamber of the furnace is of ample size and sufficiently high to receive an adequate amount of material. The liquid metal collecting at the bottom of the furnace is drained off therefrom and is transferred at regular intervals into a ladle by means of which the liquid metal is introduced into the refining furnace to finish the liquid metal obtained from the melting furnace.

The iron or steel shavings which are selected for the purpose of obtaining a high grade steel are continuously charged into the melting furnace which by virtue of the continuous operation may be maintained at such a temperature that a sufficiently hard metal is obtained. A basic slag fusible at a high temperature facilitates to obtain the latter result and in addition radical desulfurization is insured.

If iron oxid is placed into the melting furnace together with the charge of iron shavings it may be compensated by a slight addition of light coal mixed with the slag. This addition of flux is added in such proportion that not only a deoxidized slag is obtained but also a slight recarburization of the bath is effected so that the liquid metal possesses slightly a higher percentage of carbon than is required in the finished product. This increase of carbon contents facilitates the transfer of the liquid metal from the melting furnace to the finishing furnace. The operation of the refining furnace makes provision for a slight oxidation of the bath and at the same time the temperature is maintained, necessary to take samples for tests. This method as carried out in the refining furnace brings about a dephosphorization of the metal. As stated hereinbefore the introduction of additions through the charging doors of the refining furnace provides for the deoxidation of the bath and also a proper proportion of silicon and manganese may be introduced in accordance with the requirements as regards the quantity and grade of steel.

While the method has been described as being carried out in separate furnaces, being the melting furnace and the refining furnace, it is obvious that in order to increase the output it is possible to employ a plurality of melting furnaces whence the liquid metal collecting at the bottom of the several melting furnaces is drained into one refining furnace. The refining furnace may either be a Martin furnace, an electric furnace or a converter.

The employment of a Martin furnace for the refining of the liquid metal is especially advantageous as it can be placed in communication with a battery of electrical melting furnaces by a conduit. The time required for the refining or finishing of the liquid metal is of course cosiderably shorter than that necessary to obtain the liquid metal in crude condition so that the employment of a single refining furnace is possible with a battery of melting furnaces. The employment of an electrical furnace entails also the same advantages as those enumerated for the Martin furnace. Where dephosphorization is not desired the liquid metal as obtained in the melting furnace is not recarburized but it is produced with a carbon content approximately to that desired in the final product and a slight change in the carbon content can be effected in the refining apparatus such as by the introduction of carbon, cast iron or scrap.

Where a high grade steel is not required, the converter is employed although its use is not recommended.

The process described solves the problem of obtaining a high grade steel from iron and steel scrap of a small and light nature by a continuous operation, in contradistinction to the method in vogue where successive charges are introduced into the furnaces and the latter completely emptied, after each charge has been treated therein. The improved method in addition to enabling continuous operation exceedingly simplifies metallurgical working thus rendering superfluous the attendance of highly skilled experts. It also carries out the dephosphorization of the electric furnace steel in a separate furnace in a very short operation thus permitting the employment of a single finishing furnace with a battery of electric melting furnaces.

The method is not limited to the exact sequence of steps nor to electric furnaces or special ingredients employed but such references have been merely made by way of explaining the method and the rationale on which it rests. All departures and changes are included which fall within the scope of the invention as set forth in the appended claims.

I claim:

1. The process of manufacturing steel from iron and steel shavings, including the steps of continuously feeding such shavings into a furnace in the presence of a basic slag to effect desulfurization rendering the liquid metal suitable for transfer, transferring the crude liquid metal obtained in said furnace into a second furnace, and refining the metal.

2. The process of manufacturing steel from iron and steel shavings including the steps of continuously feeding said shavings into a plurality of furnaces, melting said shavings in said furnaces in the presence of a basic slag to effect desulfurization rendering the liquid metal suitable for transfer, transferring the crude liquid metal obtained in said furnaces into another furnace common to all of said first named furnaces, and refining the metal.

3. The process of manufacturing steel from iron and steel shavings including the steps of continuously feeding said shavings into a furnace, melting said shavings in said furnace in the presence of a basic slag to effect desulfurization, recarburizing the metal bath, transferring the crude liquid metal into a second furnace, reducing the carbon contents of the metal to the required amount and refining the metal.

4. The process of manufacturing steel from iron and steel shavings, including the steps of continuously feeding such shavings into a plurality of furnaces, melting said shavings in said furnaces in the presence of a basic slag to effect a desulfurization, recarburizing the metal bath, transferring the crude liquid metal obtained in said furnaces into another furnace common to all of said first named furnaces, reducing the carbon contents of the metal to the required amount and refining the metal, substantially as described.

In testimony whereof I affix my signature in presence of two witnesses.

CHARLES ALBERT KELLER.

Witnesses:
 JULES KELREW,
 CHAS. P. PRESSLY.